United States Patent
Itou et al.

[19]

[11] Patent Number: 5,822,112
[45] Date of Patent: Oct. 13, 1998

[54] CONTROL APPARATUS FOR OPTICAL AMPLIFIER

[75] Inventors: Hiroyuki Itou, Sapporo; Michikazu Shima; Yoshihito Onoda, both of Kawasaki; Yuji Tamura, Sapporo, all of Japan

[73] Assignee: Fujitsu Limited, Kanagawa, Japan

[21] Appl. No.: 630,074

[22] Filed: Apr. 15, 1996

[30] Foreign Application Priority Data

Aug. 23, 1995 [JP] Japan .................................. 7-214489

[51] Int. Cl.⁶ ............................ H04B 10/12; H01S 3/131
[52] U.S. Cl. ........................ 359/341; 359/194; 359/337
[58] Field of Search .................................. 359/134, 160, 359/161, 176, 194, 337, 341

[56] References Cited

U.S. PATENT DOCUMENTS

| | | | |
|---|---|---|---|
| 5,163,063 | 11/1992 | Yoshikawa et al. | 372/38 |
| 5,506,724 | 4/1996 | Shimizu et al. | 359/341 |
| 5,528,404 | 6/1996 | MacKichan | 359/177 |
| 5,570,227 | 10/1996 | Nabeyama et al. | 359/337 |

FOREIGN PATENT DOCUMENTS

| | | |
|---|---|---|
| 569769 | 11/1993 | European Pat. Off. . |
| 59-117285 | 7/1984 | Japan . |
| 60-223 180 | 11/1985 | Japan . |
| 3009626 | 1/1991 | Japan . |
| 05-129 701 | 5/1993 | Japan . |
| 05-235 445 | 9/1993 | Japan . |
| 05-241 209 | 9/1993 | Japan . |
| 05-291 667 | 11/1993 | Japan . |
| 6221896 | 1/1994 | Japan . |
| 06-268 602 | 9/1994 | Japan . |
| 6311110 | 11/1994 | Japan . |
| 07-15 055 | 1/1995 | Japan . |
| 7123059 | 5/1995 | Japan . |
| 2287148 | 9/1995 | United Kingdom . |
| 2289586 | 11/1995 | United Kingdom . |

*Primary Examiner*—Nelson Moskowitz
*Attorney, Agent, or Firm*—Helfgott & Karas P.C.

[57] ABSTRACT

A control apparatus for an optical amplifier such as an erbium-doped optical-fiber (EDF) amplifier suppresses overshooting of ALC control at power on and at the time of input light restoration from an off condition, while ensuring quick starting. At power on and at the time of input light restoration from an off condition, an idling current (IDC) reference value generating circuit generates an IDC reference voltage that increases to a value sufficiently greater than a value in a normal operating condition with a time constant corresponding to a rise time of the EDF, and thereby controls a laser diode for pumping the EDF. The voltage may be set to a value larger than the value in the normal operating condition for a predetermined period of time by using a timer.

14 Claims, 9 Drawing Sheets

FIG. 10 ized as 5,822,112

CONTROL APPARATUS FOR OPTICAL AMPLIFIER

BACKGROUND OF THE INVENTION

1. Field of the Invention

The present invention relates to a control apparatus for an optical amplifier such as an erbium-doped fiber amplifier.

2. Description of the Related Art

When using an optical amplifier, such as an erbium-doped fiber (EDF) amplifier, in a fiber-optic communication system, the system design requires that the output level of the amplifier be kept at a constant value. To achieve this, auto level control (ALC) is applied to the optical amplifier. That is, a portion of the output optical power of the optical amplifier is separated using an optical coupler, and the separated power is first converted to a current by a photodiode and then to a voltage which is compared with a reference voltage. The power of the pumping light is controlled in accordance with the result of the comparison.

Furthermore, an input off/on function is incorporated by which the pumping light operation is stopped when the input light power has dropped below a certain level, and is resumed when the input light power is restored.

Such an optical amplifier of the prior art, however, has the problem that the ALC control tends to overshoot at power on and at the time of input light restoration from an off condition. The overshoot is caused because there is a delay of several milliseconds (<10 ms) from the moment the pumping light is injected into the EDF to the moment stimulated emission occurs to amplify the signal light. That is, during that interval, if the pumping light power is increased, the output level remains at zero, allowing the pumping light to reach and stay at its maximum power.

Rather than keeping the ALC that controls the output light power of the optical amplifier at a constant level, another method of controlling the pumping light at power on may be considered, such as auto power control (APC) that controls the pumping light power at a constant level or auto current control (ACC) that controls the current flowing to a pumping laser diode at a constant level. With APC or ACC, by holding the pumping light power at a certain low level for a period between power on and the start of stimulated emission, the overshoot immediately after the start of stimulated emission can be prevented.

However, research has revealed that there is a correlation between the magnitude of the injection power of pumping light into the EDF immediately after power on and the time required until the start of stimulated emission, which leads to the problem that if the injection power into the EDF immediately after power on is small, the time required for stimulated emission to occur becomes long.

SUMMARY OF THE INVENTION

It is, accordingly, an object of the present invention to provide a control apparatus, for an optical amplifier, that suppresses overshooting of ALC control at power on and at the time of input light restoration from an off condition, while ensuring quick starting.

According to the present invention, there is provided a control apparatus for an optical amplifier, comprising: an automatic level controller for controlling power of pumping light supplied to the optical amplifier to maintain output power of the optical amplifier at a constant power level; a shutdown controller for, stopping the supply of the pumping light regardless of the control from the automatic level controller when input power of the optical amplifier has dropped below a predetermined value and starter controller for supplying the optical amplifier with pumping light of power substantially greater than the power thereof in a normal operating condition of the optical amplifier for a period of time sufficient to prevent overshooting regardless of the control from the automatic level controller, when the input power of the optical amplifier has recovered from the drop.

According to the present invention, there is also provided a method of controlling an optical amplifier, comprising the steps of: (a) controlling power of pumping light supplied to the optical amplifier to maintain output power of the optical amplifier at a constant power level; (b) stopping the supply of the pumping light regardless of the control of step (a) when input power of the optical amplifier has dropped below a predetermined value and (c) supplying the optical amplifier with pumping light of power substantially greater than the power thereof in a normal operating condition of the optical amplifier for a period of time sufficient to prevent overshooting regardless of the control of step (a) when the input power of the optical amplifier has recovered from the drop.

DESCRIPTION OF THE PREFERRED EMBODIMENTS

Figure 1:
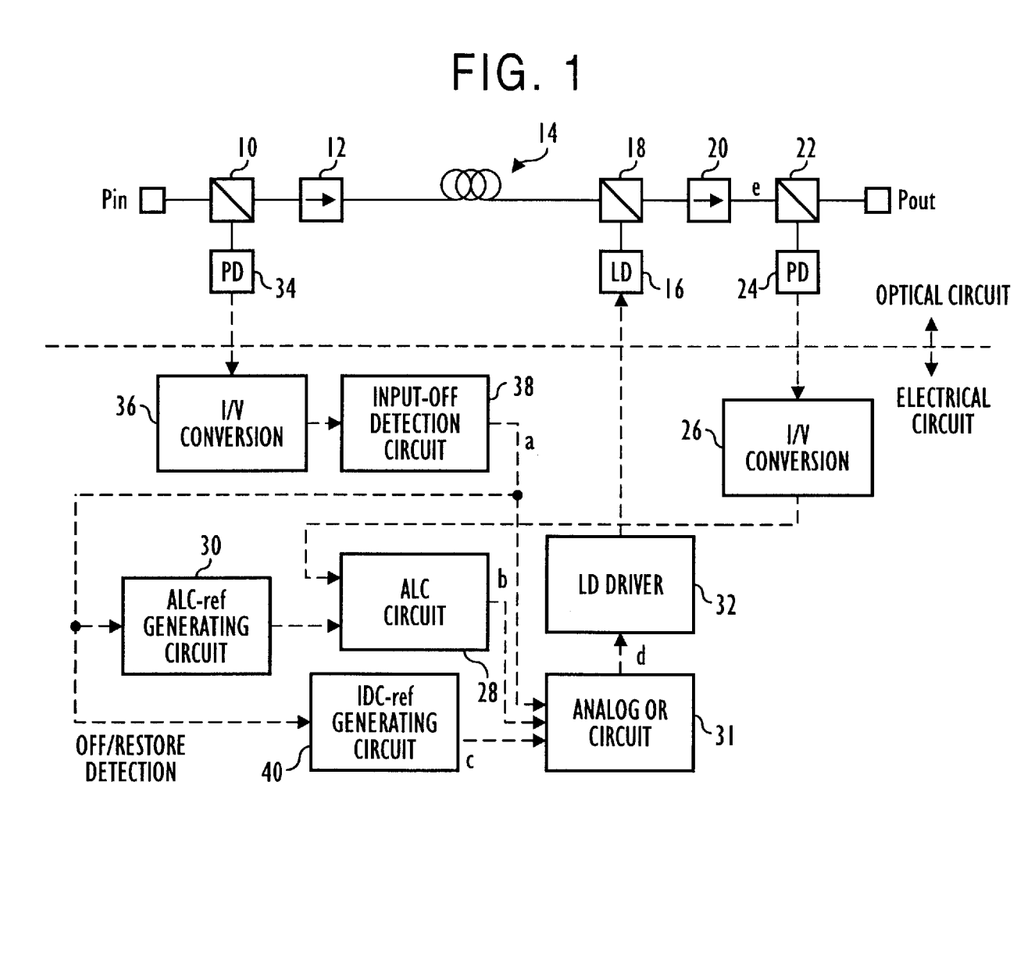
FIG. 1 is a block diagram of a first embodiment of the present invention.

FIG. 1 is a block diagram showing one embodiment of a control apparatus for an optical amplifier according to the present invention. In FIG. 1, signal light is fed into an erbium-doped fiber (EDF) 14, after passing through an optical coupler 10 and an optical isolator 12. Pumping light generated by a laser diode 16 is passed through a wavelength-division multiplexer (WDM) 18 and injected into the EDF 14 in a direction opposite to the direction of the signal light (backward pumping). Of course, the present invention is equally applicable for a forward pumping arrangement. The signal light amplified by the fiber 14 is passed through the WDM 18 and an optical isolator 20, and is split by an optical coupler 22. Part of the output signal light split by the optical coupler 22 is converted by a photodiode 24 into an electrical signal which is supplied to an I/V conversion circuit 26 for conversion into a voltage signal. The voltage signal is supplied to an ALC circuit 28, where the signal output from the I/V conversion circuit 26, which indicates the optical output signal level, is compared with a reference signal generated by an ALC reference value generating circuit 30 which indicates a control target value. In accordance with the result of the comparison, the ALC circuit 28 outputs a control signal for making the two signals match. The control signal from the ALC circuit 28 is applied to an analog OR circuit 31 whose output is coupled to an LD driver 32. The LD driver 32 supplies a drive current proportional to the control signal to the laser diode 16. In this way, the power of the signal light emerging from the EDF 14 is controlled to a constant level.

Figure 2:
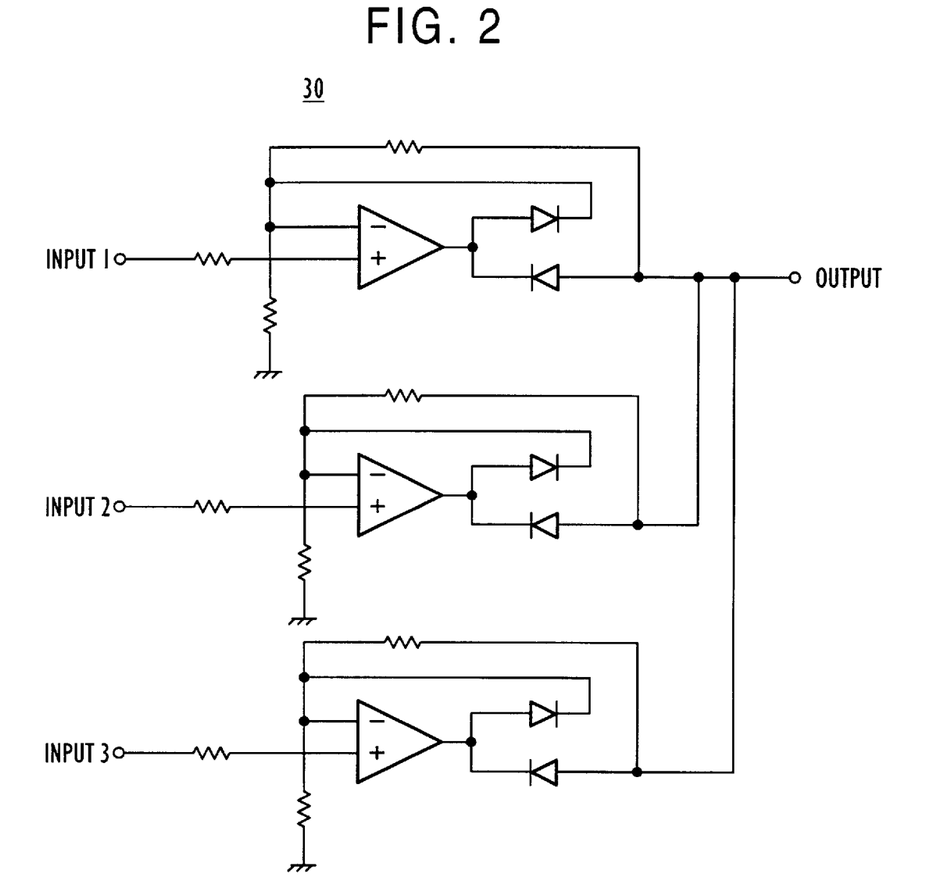
FIG. 2 is a circuit diagram showing the configuration of an analog OR circuit 31 in FIG. 1.

The input signal light to the EDF 14 is split by the optical coupler 10 for separation of a portion of its power. The separated optical power is first converted into an electrical signal by a photodiode 34, and then converted into a voltage signal by an I/V conversion circuit 36. An input-off detection circuit 38 compares the signal output from the I/V conversion circuit 36, which indicates the input signal light level, with a predetermined voltage value, and when it is lower than the predetermined voltage value, outputs a minimum level voltage signal to stop the oscillation of the laser diode 16. The voltage signal from the input-off detection circuit 38 is applied to a second input of the analog OR circuit 31. The analog OR circuit 31 has a configuration such as the one shown in FIG. 2, for example, and selects a voltage signal of the lowest voltage level from among the plurality of voltage signals input to it. Therefore, when the minimum level signal is output from the input-off detection circuit 38, that signal is selected for output in preference to the control signal from the ALC circuit 28. As a result, when an off condition of the input optical signal is detected, the pumping light injection into the EDF 14 is also stopped.

Figure 3:
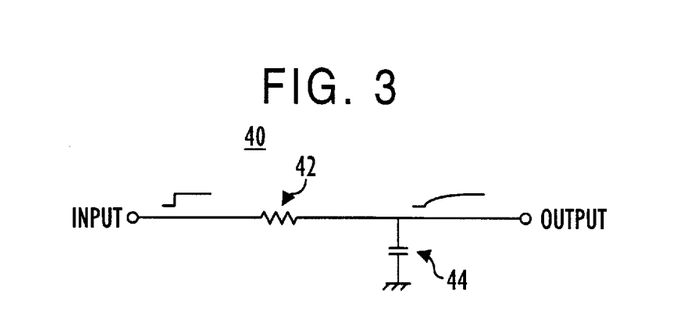
FIG. 3 is a circuit diagram showing the configuration of an IDC reference value generating circuit in FIG. 1.

The output signal from the input-off detection circuit 38 is also supplied to an idling current (IDC) reference value generating circuit 40. The IDC reference value generating circuit 40 comprises, for example, a resistor 42 and a capacitor 44, as shown in FIG. 3. Since the circuit of FIG. 3 is a first-order lag element, when the input changes in a stepwise manner the output changes exponentially. The time constant of the change, that is, the time required for the output to increase to 63% of its final value, is expressed by C×R (where C is the capacitance of the capacitor 44 and R the resistance of the resistor 42). The time constant of the IDC reference value generating circuit 40 is set to a value corresponding to the rising delay of the EDF, that is, the time that elapses from the moment the injection of the pumping light into the EDF is started, until the initiation of stimulated emission. Further, the output voltage value of the IDC reference value generating circuit 40, when the above time has elapsed, is made sufficiently greater than the output voltage value of the ALC circuit in a normal operating condition.

Figure 4:
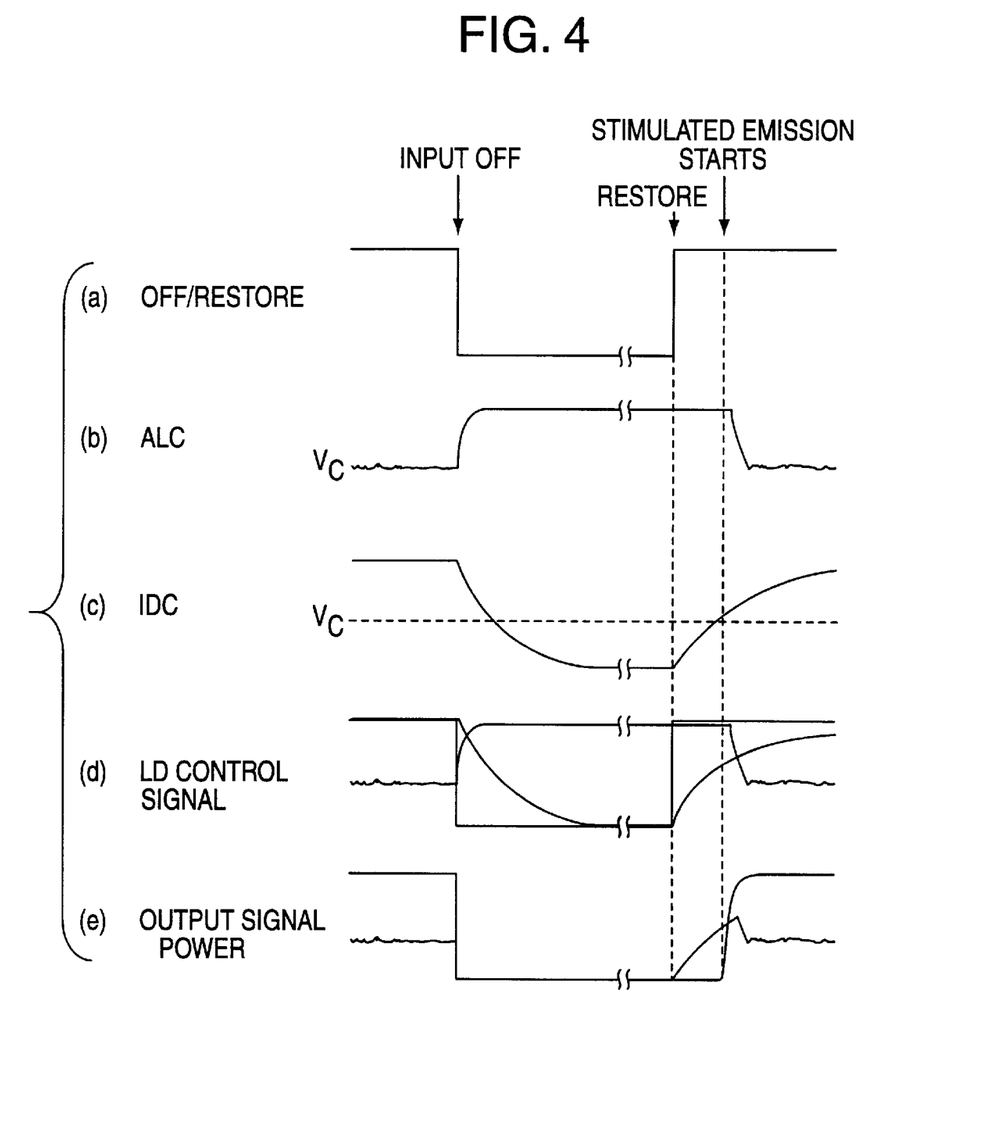
FIG. 4 is a waveform diagram for explaining the operation of the circuit of FIG. 1.

FIG. 4 is a waveform diagram for explaining the operation of the circuit of FIG. 1. In FIG. 4, parts (a) to (e) show waveforms at corresponding points, a to e, in FIG. 1. When an off condition of the input optical signal is detected, the output of the input-off detection circuit 38 is driven to the minimum level (FIG. 4(a)), while the output signal of the ALC circuit 28 is raised to a maximum level (FIG. 4(b)). As a result, the analog OR circuit 31 outputs the minimum level signal so that the oscillation of the laser diode 16 stops. When the input optical signal is restored, the output of the input-off detection circuit 38 instantaneously rises to the maximum level (FIG. 4(a)), but because of the delay of the EDF, the optical signal is not output immediately (FIG. 4(e)). The output of the ALC circuit 28 also remains at the maximum level. At this time, the output of the IDC reference value generating circuit 40 increases exponentially with the time constant CR (described earlier) (FIG. 4(c)). During this interval, since the output voltage of the IDC reference value generating circuit 40 is the lowest of all the inputs to the analog OR circuit 31, as shown in FIG. 4(d), the laser diode control signal increases exponentially, as shown by a thick line in FIG. 4(d). Then, stimulated emission starts and the output voltage of the ALC circuit 28 drops (FIG. 4(b)), as a result of which the control automatically switches to the ALC (FIG. 4(d)). The operation at power on is the same as when the input optical signal is restored.

As explained with reference to FIG. 4, during the interval between the moment the input optical signal is restored and the moment stimulated emission starts, the circuit of FIG. 1 performs control using the output of the IDC reference value generating circuit 40 instead of the ALC control signal output from the ALC circuit 28. This suppresses the overshooting that would otherwise occur upon initiation of stimulated emission. Furthermore, since, during a certain period before the control is switched to the ALC, the IDC output is sufficiently greater than the ALC control voltage Vc (FIG. 4(b)) in the normal operating condition, the EDF can rise quickly.

Figure 5:
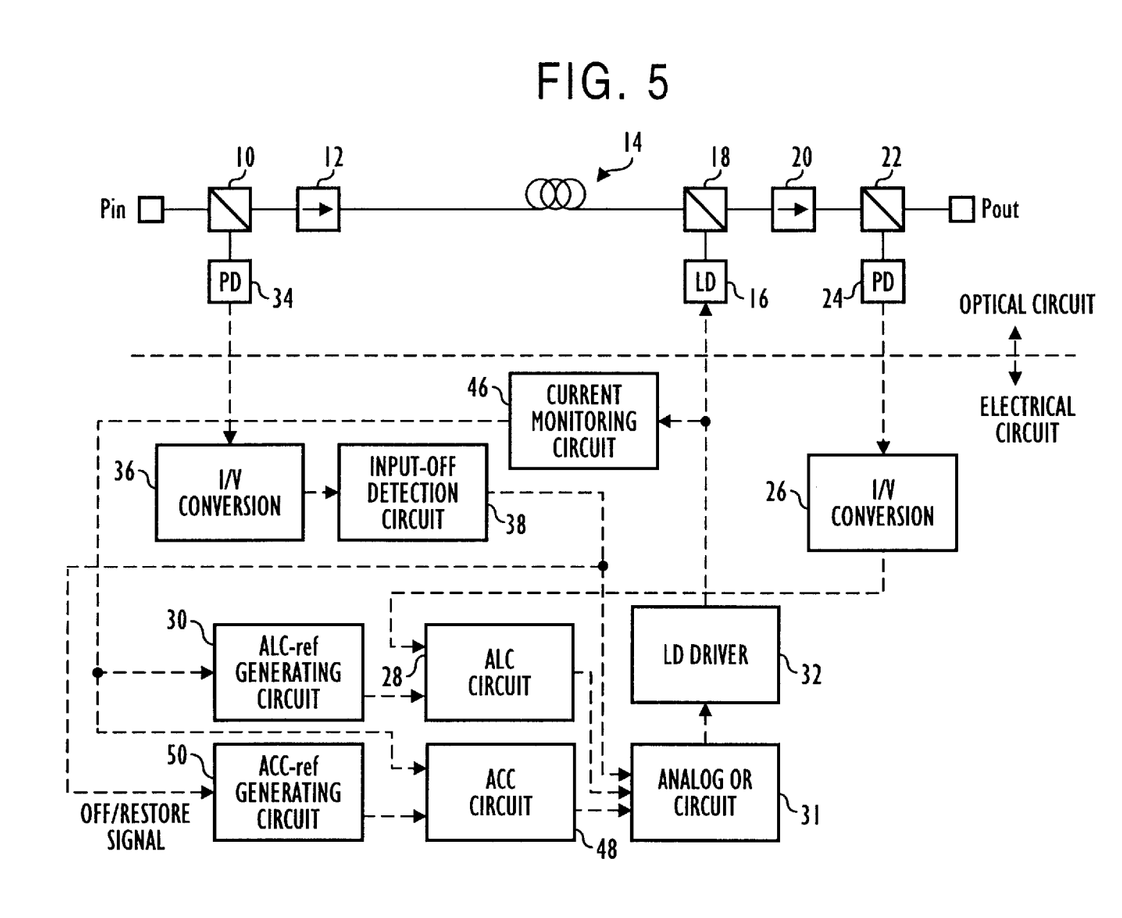
FIG. 5 is a block diagram showing a modified example of the circuit of FIG. 1.

FIG. 5 shows a modified example of the circuit of FIG. 1. In FIG. 5 and other figures hereinafter given, the same component elements are designated by the same reference numerals. An automatic current control (ACC) reference value generating circuit 50 has the configuration shown in FIG. 3, which is the same as that of the IDC reference value generating circuit 40 in FIG. 1. In the circuit of FIG. 1, the reference voltage output from the IDC reference value generating circuit 40 is directly used as the idling current control signal; in the circuit of FIG. 5, on the other hand, the drive current being supplied to the laser diode 16 is monitored by a current monitoring circuit 46, and a control signal for bringing the output of the current monitoring circuit 46 into agreement with the reference voltage output from the ACC reference value generating circuit 50 is generated by an ACC circuit 48 and is applied to the analog OR circuit 31. Since the ACC reference value generating circuit 50 has the same configuration as the IDC reference value generating circuit 40 shown in FIG. 3, the output voltage of the ACC circuit 48 changes in almost the same manner as the output of the IDC reference value generating circuit 40 in FIG. 1.

Figure 6:
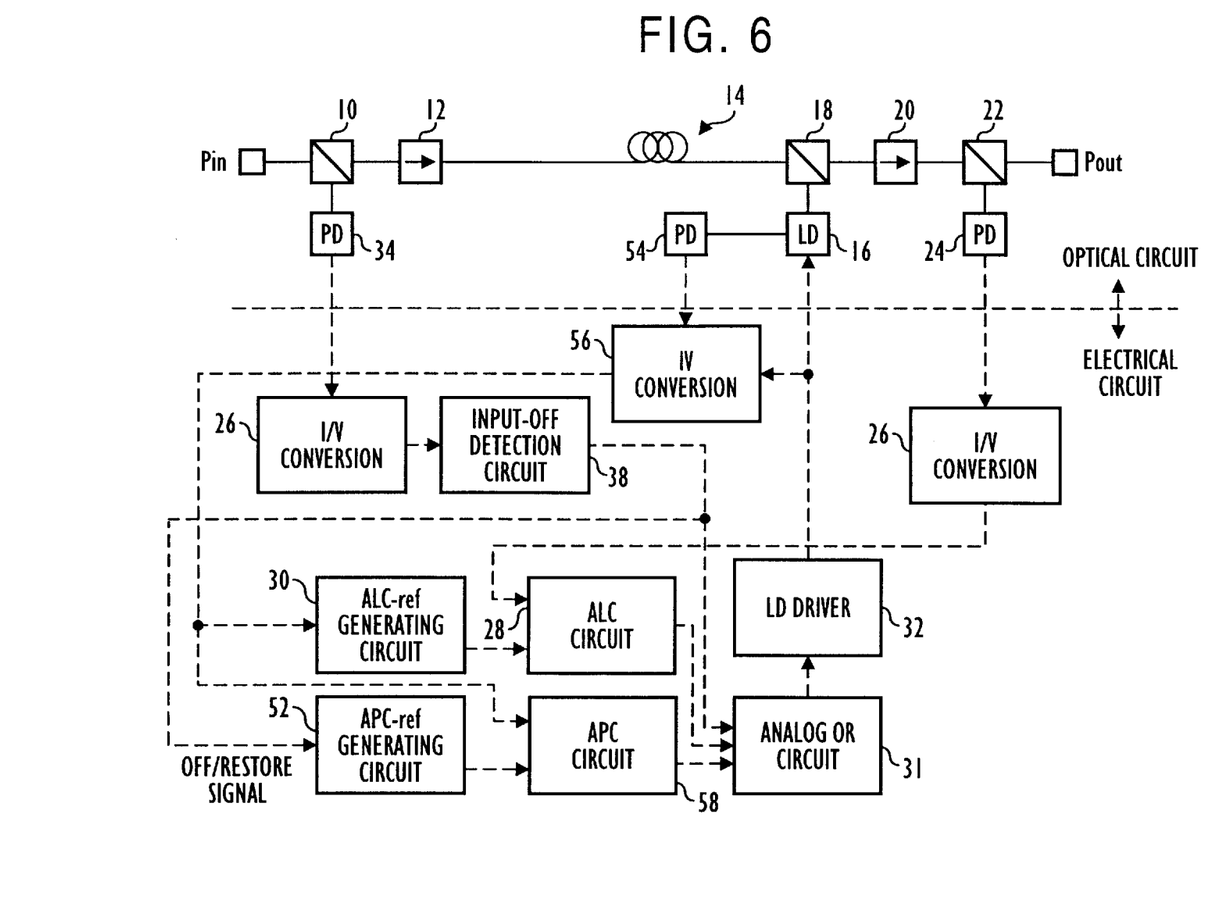
FIG. 6 is a block diagram showing a second modified example of the circuit of FIG. 1.

FIG. 6 shows a second modified example of the circuit of FIG. 1. An automatic power control (APC) reference value generating circuit 52 has the configuration shown in FIG. 3, which is the same as that of the IDC reference value generating circuit 40 in FIG. 1. In the circuit of FIG. 1, the reference voltage output from the IDC reference value generating circuit 40 is directly used as the idling current control signal; in the circuit of FIG. 6, on the other hand, backward light of the laser diode 16 is first converted into a current by a photodiode 54 and then converted into a voltage by an I/V conversion circuit 56, and a control signal for bringing the output of the I/V conversion circuit 56 into agreement with the reference voltage output from the APC reference value generating circuit 52 is generated by an APC circuit 58 and is applied to the analog OR circuit 30.

Figure 7:
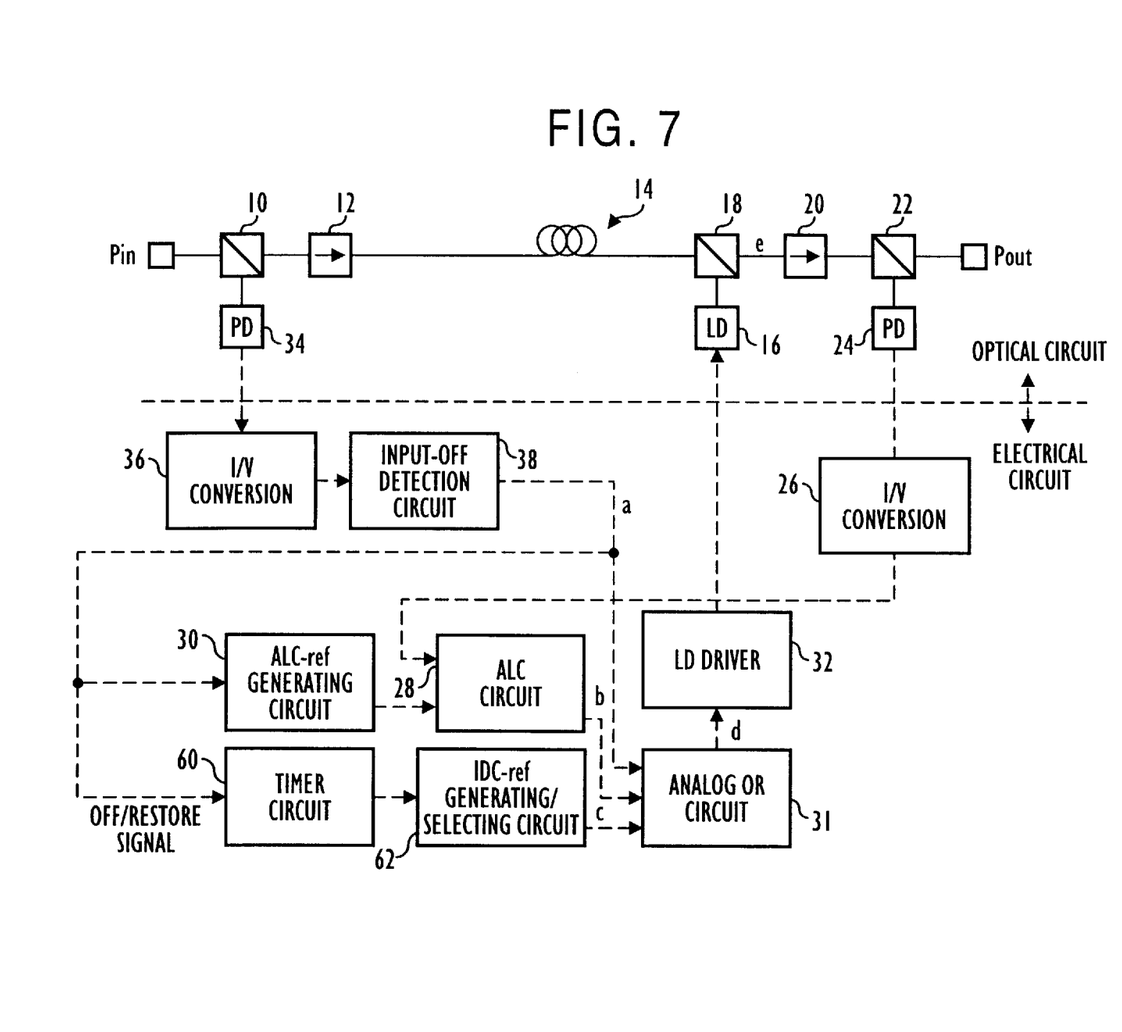
FIG. 7 is a block diagram of a second embodiment of the present invention.

FIG. 7 shows a second embodiment of the optical amplifier control apparatus according to the present invention. In the control apparatus described with reference to FIGS. 1 to 6, the idling current is increased exponentially until it reaches a value sufficiently greater than the drive current in the normal operating condition, whereas, in the circuit of FIG. 7, the time elapsing from the restoration of the input optical signal is counted by a timer circuit 60, which changes the idling current set value that an IDC reference value generating/selecting circuit 62 outputs.

Figure 8:
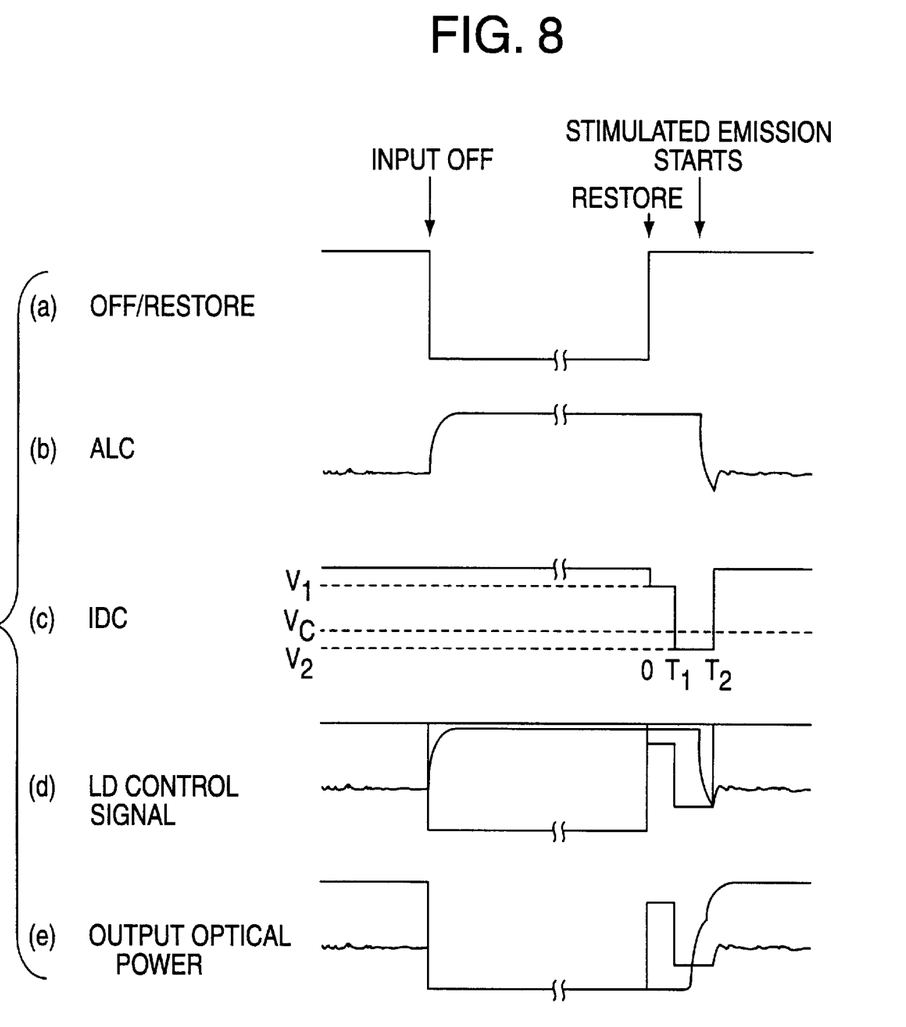
FIG. 8 is a waveform diagram for explaining the operation of the circuit of FIG. 7.

FIG. 8 is a waveform diagram for explaining the operation of the circuit of FIG. 7. In FIG. 8, parts (a) to (e) show waveforms at corresponding points, a to e, in FIG. 7. As shown in FIG. 8(c), for a period starting from the restoration of the input light, until time $T_1$ elapses, the IDC reference value output from the IDC reference value generating/selecting circuit 62 is set to a value $V_1$ greater than the value Vc in the normal operating condition, and for a period after that, it is set to a value $V_2$ smaller than Vc, until time $T_2$ elapses, whereupon it is set to the maximum voltage. Time $T_2$ is chosen to be equal to the rising delay of the EDF. By setting the IDC reference value to its maximum value when Time $T_2$ has elapsed, the control is switched to the ALC, as shown in FIG. 8(e). In the circuit of FIG. 7 also, the occurrence of overshoot is prevented, while ensuring a quick rise of the EDF.

Figure 9:
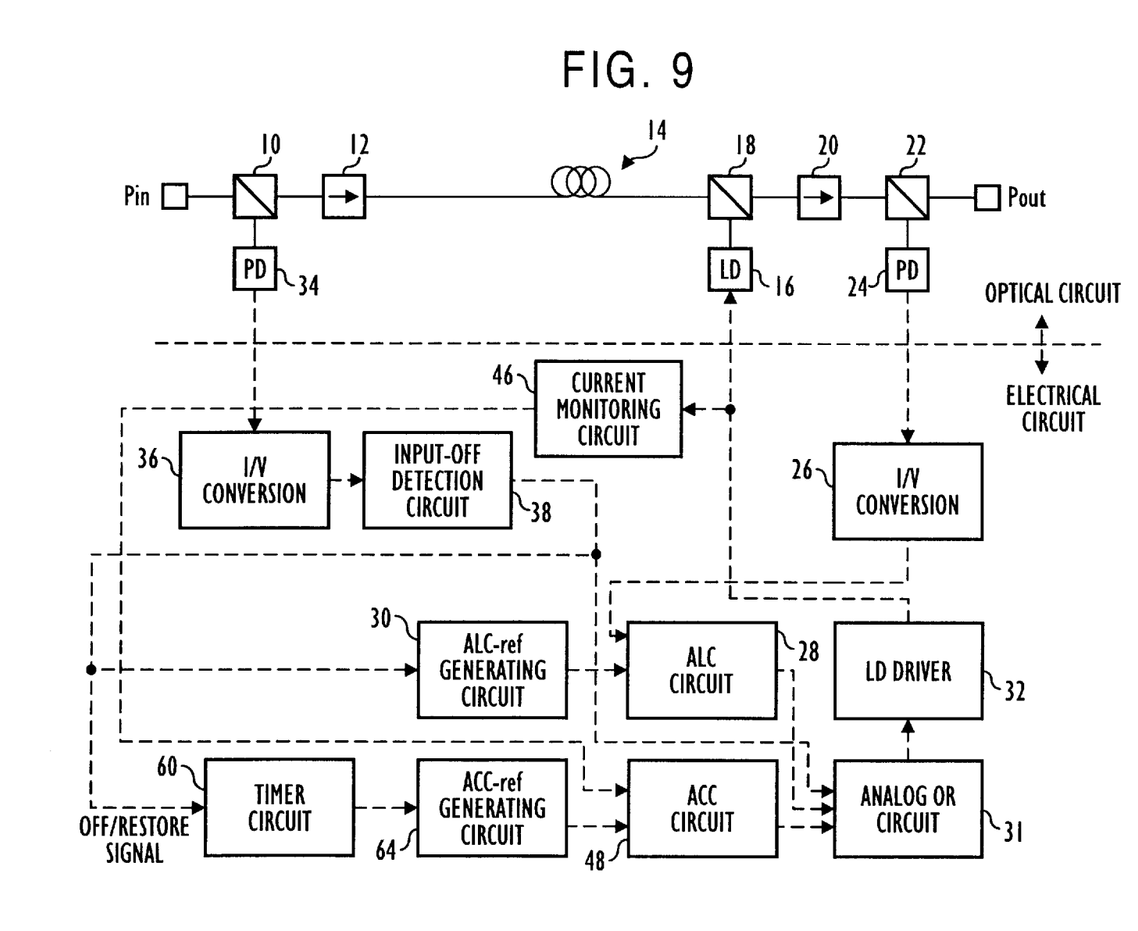
FIG. 9 is a block diagram showing a modified example of the circuit of FIG. 7.

FIG. 9 shows a modified example of the circuit of FIG. 7. An automatic current control (ACC) reference value generating circuit 64 is similar in configuration to the IDC reference value generating circuit 62 shown in FIG. 7. In the circuit of FIG. 7, the reference voltage output from the IDC reference value generating circuit 62 is directly used as the idling current control signal; in the circuit of FIG. 9, on the other hand, the drive current being supplied to the laser diode 16 is monitored by a current monitoring circuit 46, and a control signal for bringing the output of the current monitoring circuit 46 into agreement with the reference voltage output from the ACC reference value generating circuit 64 is generated by an ACC circuit 48 and is applied to the analog OR circuit 31.

Figure 10:
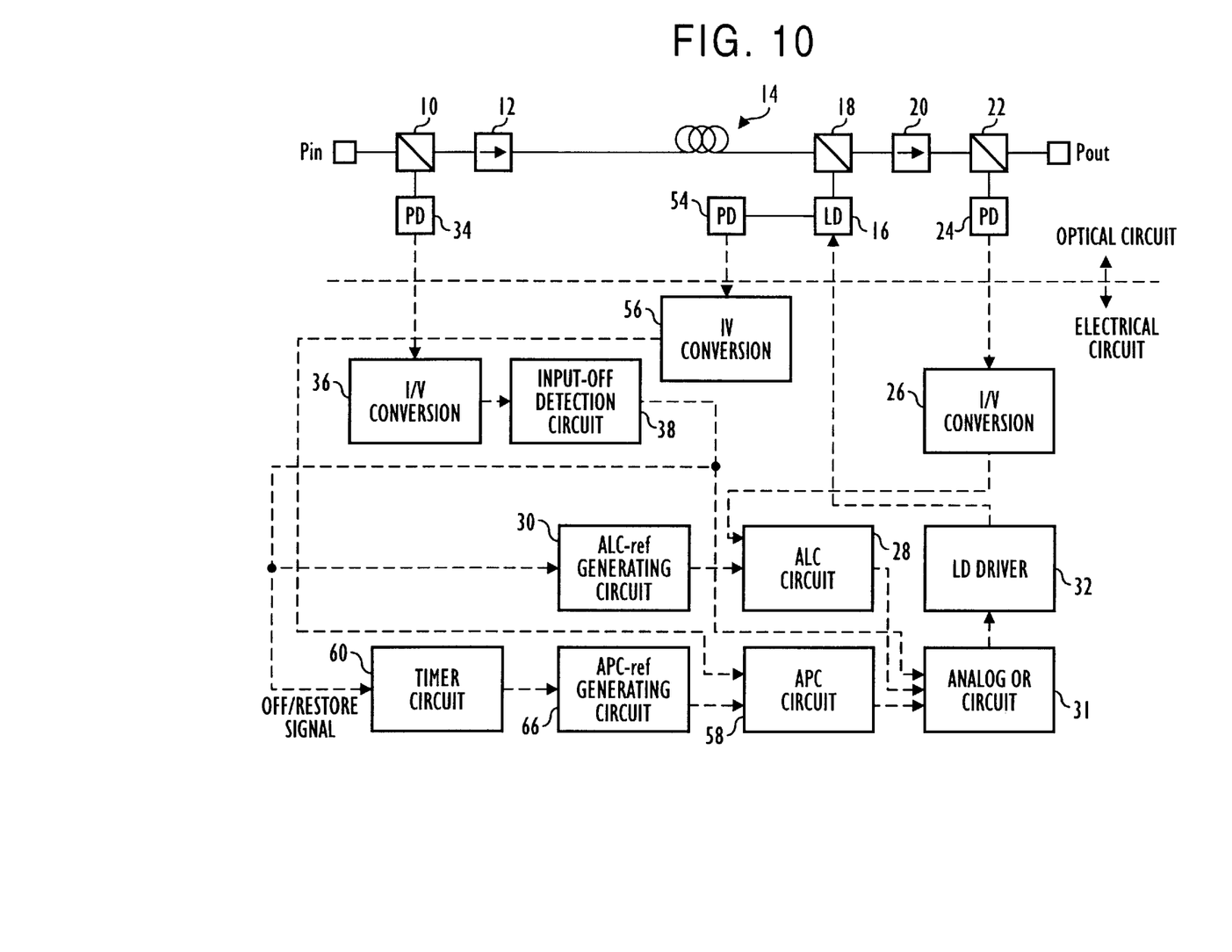
FIG. 10 is a block diagram showing a second modified example of the circuit of FIG. 7.

FIG. 10 shows a second modified example of the circuit of FIG. 7. An automatic power control (APC) reference value generating circuit 66 is similar in configuration to the IDC reference value generating circuit 62 shown in FIG. 7. In the circuit of FIG. 7, the reference voltage output from the IDC reference value generating circuit 62 is directly used as the idling current control signal; in the circuit of FIG. 10, on the other hand, backward light from the laser diode 16 is first converted into a current by a photodiode 54 and then converted into a voltage by an I/V conversion circuit 56, and a control signal for bringing the output of the I/V conversion circuit 56 into agreement with the reference voltage output from the APC reference value generating circuit 66 is generated by an APC circuit 58 and is applied to the analog OR circuit 31.

As described above, according to the present invention, overshooting of ALC control at power on and at the time of input light restoration from an off condition is suppressed, while ensuring a quick rise of the EDF.

We claim:

1. A control apparatus for an optical amplifier, comprising:

an automatic level controller for controlling power of pumping light, supplied to the optical amplifier to maintain output power of the optical amplifier at a constant power level;

a shutdown controller for stopping the supply of the pumping light regardless of the control from the automatic level controller, when input power of the optical amplifier has dropped below a predetermined value; and a starter controller for supplying the optical amplifier with pumping light of power substantially greater than the power thereof in a normal operating condition of the optical amplifier for a period of time sufficient to prevent overshooting, regardless of the control from the automatic level controller, when the input power of the optical amplifier has recovered from the drop.

2. A control apparatus according to claim 1, wherein the starter controller supplies the optical amplifier with the pumping light of the power substantially greater than the power thereof in the normal operating condition for the period of time sufficient to prevent overshooting, by exponentially increasing the power of the pumping light from zero to the power greater than the power thereof in the normal operating condition with a time constant corresponding to a time required for the optical amplifier output to rise.

3. A control apparatus according to claim 2, further comprising a light-emitting device for generating the pumping light, a driving circuit for generating a drive current for the light-emitting device in accordance with a control voltage, and an analog OR circuit for selecting a high priority control voltage from among a plurality of control voltage inputs for supply to the driving circuit, wherein the automatic level controller includes a first optical coupler for separating a portion of the power of the output light of the optical amplifier, a first light detector for converting the optical power separated by the first optical coupler into an electrical signal, and an automatic level control circuit for controlling the power of the output light of the optical amplifier at a constant level by generating a first control voltage on the basis of the electrical signal output from the first light detector and by supplying the first control voltage to the analog OR circuit, wherein the shutdown controller includes a second optical coupler for separating a portion of the power of the input light to the optical amplifier, a second light detector for converting the optical power separated by the second optical coupler into an electrical signal, and an input-off detection circuit for, when the power level of the input light to the optical amplifier has dropped below the predetermined value, stopping the supply of the pumping light generated by the light-emitting device, by generating a second control signal having a higher priority than the first control signal on the basis of the electrical signal output from the second light detector and by supplying the second control signal to the analog OR circuit, and wherein the starter controller generates a third control signal which increases exponentially from zero and which has a higher priority than the first control signal, and supplies the third control signal to the analog OR circuit.

4. A control apparatus according to claim 3, wherein the starter controller includes an idling current reference value generating circuit for generating, as the third control signal, a signal exponentially increasing from zero.

5. A control apparatus according to claim 3, further comprising a current monitoring circuit for monitoring the drive current supplied to the light-emitting device, wherein the starter controller includes a reference value generating circuit for generating a signal exponentially increasing from zero, and an automatic current control circuit for generating the third control signal on the basis of the output of the current monitoring circuit and the output signal from the reference value generating circuit.

6. A control apparatus according to claim 3, further comprising a third light detector for monitoring the power of the output light of the light-emitting device, wherein the starter controller includes
a reference value generating circuit for generating a signal exponentially increasing from zero, and
an automatic power control circuit for generating the third control signal on the basis of the output of the third light detector and the output signal from the reference value generating circuit.

7. A control apparatus according to claim 1, wherein the starter controller supplies the optical amplifier with the pumping light at a power substantially greater than the power thereof in the normal operating condition for the period of time sufficient to prevent overshooting, by setting the optical power of the pumping light to a second predetermined value greater than the optical power thereof in the normal operating condition for a predetermined length of time shorter than a time required for the optical amplifier output to rise.

8. A control apparatus according to claim 7, further comprising
a light-emitting device for generating the pumping light,
a driving circuit for generating a drive current for the light-emitting device in accordance with a control voltage, and
an analog OR circuit for selecting a high priority control voltage from among a plurality of control voltage inputs for supply to the driving circuit,
wherein the automatic level controller includes
a first optical coupler for separating a portion of the power of the output light of the optical amplifier,
a first light detector for converting the optical power separated by the first optical coupler into an electrical signal, and
an automatic level control circuit for controlling the power of the output light of the optical amplifier at a constant level by generating a first control voltage on the basis of the electrical signal output from the first light detector and by supplying the first control voltage to the analog OR circuit, wherein
the shutdown controller includes
a second optical coupler for separating a portion of the power of the input light to the optical amplifier,
a second light detector for converting the optical power separated by the second optical coupler into an electrical signal, and
an input-off detection circuit for, when the power level of the input light to the optical amplifier has dropped below the predetermined value, stopping the supply of the pumping light generated by the light-emitting device, by generating a second control signal having a higher priority than the first control signal on the basis of the electrical signal output from the second light detector and by supplying the second control signal to the analog OR circuit, and wherein
the starter controller generates a third control signal having a higher priority than the first control signal and by which, during a first period, starting from the moment the power level of the input light has risen above the second predetermined until the predetermined length of time elapses, the optical power of the pumping light is set to a value greater than the optical power thereof in the normal operating condition, and during a second period, starting from the moment the predetermined length of time has elapsed, until the optical amplifier output rises, the optical power of the pumping light is set to a value smaller than the power thereof in the normal operating condition, and supplies the third control signal to the analog OR circuit.

9. A control apparatus according to claim 8, wherein the starter controller includes
a timer circuit for measuring the first and second periods, and
an idling current reference value generating circuit for generating the third control signal in accordance with an output from the timer circuit.

10. A control apparatus according to claim 8, further comprising a current monitoring circuit for monitoring the drive current being supplied to the light-emitting device, wherein the starter controller includes
a timer circuit for monitoring the first and second periods,
a reference value generating circuit for generating a reference signal in accordance with an output from the timer circuit, and
an automatic current control circuit for generating the third control signal on the basis of the output of the current monitoring circuit and the output signal from the reference value generating circuit.

11. A control apparatus according to claim 8, further comprising a third light detector for monitoring the power of the output light of the light-emitting device, wherein the starter controller includes
a timer circuit for monitoring the first and second periods,
a reference value generating circuit for generating a reference signal in accordance with an output from the timer circuit, and
an automatic power control circuit for generating the third control signal on the basis of the output of the third light detector and the output signal from the reference value generating circuit.

12. A method of controlling an optical amplifier, comprising the steps of:
(a) controlling power of pumping light supplied to the optical amplifier to maintain output power of the optical amplifier at a constant power level;
(b) stopping the supply of the pumping light regardless of the control of step (a), when input power of the optical amplifier has dropped below a predetermined value; and
(c) supplying the optical amplifier with pumping light of power substantially greater than the power thereof in a normal operating condition of the optical amplifier for a period of time sufficient to prevent overshooting regardless of the control of step (a), when the input power of the optical amplifier has recovered from the drop.

13. A method according to claim 12, wherein in step (c) the optical amplifier is supplied with the pumping light of the power substantially greater than the power thereof in the normal operating condition for the period of time sufficient to prevent overshooting, by exponentially increasing the power of the pumping light from zero to the power greater than the power thereof in the normal operating condition with a time constant corresponding to a time required for the optical amplifier output to rise.

14. A method according to claim 12, wherein in step (c) the optical amplifier is supplied with the pumping light at a power substantially greater than the power thereof in the normal operating condition for the period of time sufficient to prevent overshooting, by setting the optical power of the pumping light to a second predetermined value greater than the optical power thereof in the normal operating condition for a predetermined length of time shorter than a time required for the optical amplifier output to rise.

* * * * *